United States Patent
Cramb, III et al.

(10) Patent No.: US 6,814,412 B2
(45) Date of Patent: Nov. 9, 2004

(54) ELASTOMERIC SEAT BACK AND SLIDE-OVER HEAD REST ASSEMBLY FOR A VEHICLE SEAT

(75) Inventors: Richard Dean Cramb, III, Redford, MI (US); Jaron Rothkop, Detroit, MI (US); Ronald Louis Miotto, Romulus, MI (US)

(73) Assignee: Lear Corporation, Southfield, MI (US)

( * ) Notice: Subject to any disclaimer, the term of this patent is extended or adjusted under 35 U.S.C. 154(b) by 80 days.

(21) Appl. No.: 10/292,366

(22) Filed: Nov. 12, 2002

(65) Prior Publication Data

US 2003/0122413 A1 Jul. 3, 2003

Related U.S. Application Data

(62) Division of application No. 09/699,800, filed on Oct. 30, 2000, now Pat. No. 6,478,381.
(60) Provisional application No. 60/162,493, filed on Oct. 29, 1999.

(51) Int. Cl.[7] ................................................. A47C 5/02
(52) U.S. Cl. ............................. 297/452.13; 297/440.11; 297/452.56
(58) Field of Search ........................ 297/452.13, 452.56, 297/440.11, 452.63, 452.2, 218.5, 224, 452.64, 452.1

(56) References Cited

U.S. PATENT DOCUMENTS

| | | | |
|---|---|---|---|
| 2,865,436 A | * | 12/1958 | Thorne |
| 3,179,469 A | * | 4/1965 | Heuston |
| 4,118,089 A | * | 10/1978 | Johnson et al. |
| 4,545,614 A | | 10/1985 | Abu-Isa et al. |
| 4,699,427 A | | 10/1987 | Kobayashi |
| 4,834,451 A | | 5/1989 | Meunier et al. |
| 4,869,554 A | | 9/1989 | Abu-Osa et al. |
| 4,939,183 A | | 7/1990 | Abu-Isa et al. |
| 5,013,089 A | * | 5/1991 | Abu-Isa et al. |
| 5,058,949 A | | 10/1991 | Von Hoffman |
| 5,102,196 A | | 4/1992 | Kaneda et al. |
| 5,393,126 A | | 2/1995 | Boulva |
| 5,457,968 A | | 10/1995 | McClintock et al. |
| 5,582,463 A | * | 12/1996 | Linder et al. ............ 297/452.2 |
| 5,709,431 A | | 1/1998 | Horn |
| 5,768,758 A | | 6/1998 | Deignan et al. |
| 5,775,779 A | | 7/1998 | Abu-Isa et al. |
| 5,879,055 A | | 3/1999 | Dishner et al. |
| 5,934,758 A | | 8/1999 | Ritch et al. |
| 5,967,614 A | | 10/1999 | Schmidt |
| 6,035,901 A | | 3/2000 | Stumpf et al. |
| 6,102,482 A | | 8/2000 | Dettoni et al. |
| 6,231,125 B1 | * | 5/2001 | Maeda et al. .......... 297/452.56 |
| 6,478,381 B1 | * | 11/2002 | Cramb, III et al. ..... 297/452.13 |

* cited by examiner

*Primary Examiner*—Peter M. Cuomo
*Assistant Examiner*—Stephen Vu
(74) *Attorney, Agent, or Firm*—Bill C. Panagos

(57) ABSTRACT

A vehicle seat assembly is provided having a seat bottom and a seat back assembly connected to the seat bottom. The seat back assembly includes a support frame having a pair of opposing substantially vertical side frame members which receive an elastomeric support webbing. The elastomeric support webbing extends between and cooperates with the opposing side frame members to provide structural support for the passenger seated in the vehicle seat. Side bolsters are attached to the elastomeric support webbing adjacent the opposing side frame members. A headrest or upper bolster is secured to the top of the seat frame adjacent the side bolsters.

10 Claims, 3 Drawing Sheets

295 # ELASTOMERIC SEAT BACK AND SLIDE-OVER HEAD REST ASSEMBLY FOR A VEHICLE SEAT

CROSS-REFERENCE TO RELATED APPLICATIONS

This application is a divisional of U.S. application Ser. No. 09/699,800 filed Oct. 30, 2000, now U.S. Pat. No. 6,478,381 B1 issued Nov. 12, 2002, which, in turn, claims the benefit U.S. provisional application Ser. No. 60/162,493, filed Oct. 29, 1999.

TECHNICAL FIELD

The present invention generally relates to improvements in vehicle seat assemblies, and more particularly to a seat back assembly that significantly reduces weight of the seat, and an improved headrest assembly arranged to simplify installation.

BACKGROUND ART

Generally, vehicle seats are formed as an assembly of elements including internal structural support mechanisms attached to a bottom and back frame member so as to extend across the seating area, a padding layer positioned over the support mechanism and the frame, and a finish seat covering sewn to provide the final protective and aesthetic appearance of the seat. An example of a conventional seat frame having metal support springs extending across the back fame is shown in FIG. 1.

While such a seat assembly has proven satisfactory for many vehicles, the need to develop vehicles having lower manufacturing costs and better fuel efficiency has heightened the need to provide vehicle component designs that simplify manufacturing processes while also lowering overall vehicle weight. Such considerations are also critical in designing alternative fuel vehicles.

One area for reducing the weight of a vehicle is provide lower weight vehicle seats. However, because conventional vehicle seat assemblies require providing separate and assembling separate structural components, it is difficult to meet to the above-noted design goals. Accordingly, a need exists for a vehicle seat assembly and method of manufacturing that reduces overall weight of the seat. In addition, a need exists for a vehicle seat design, including a head rest assembly, that simplifies the overall assembly process of the vehicle seat.

DISCLOSURE OF INVENTION

It is therefore an object of this invention to provide a vehicle seat back assembly that significantly reduces overall weight of the seat by eliminating the need for a separate, internal back support mechanism.

It is another object of the present invention to provide a vehicle seat back assembly that significantly reduces overall weight of the seat by using an elastomeric frame cover that functions as both a finish covering material and a back support structure, thereby eliminating the need for a separate back support arrangement.

It is another object of the present invention to provide a head rest assembly that is both light weight and designed to simplify mounting to a vehicle seat.

The present invention overcomes the above-referenced problems associated with prior vehicle seating assemblies by providing a seating assembly for a vehicle having a seat bottom and a seat back assembly connected to the seat bottom. The seat back assembly includes a frame having a top frame member and a pair of opposing substantially vertical side frame members extending away from the top frame member which receive an elastomeric support webbing. A bottom frame member disposed opposite the top frame member extends between the opposing side frame members to provide additional structural support.

The elastomeric support webbing extends between the opposing side frame members to provide support for a passenger seated in the vehicle seat. The elastomeric support webbing includes at least one elastomeric webbing section having an inner periphery disposed about an outer surface of the opposing side frame members and an outer periphery stretched between the opposing side frame members to provide passenger support as the seat back assembly. The at least one section of elastomeric support webbing includes a pair of elastomeric fabric pieces secured to one another about common vertical edges. Alternatively, the at least one section of elastomeric support webbing comprises a single piece of elastomeric fabric secured to the outer surface of the opposing side frame members.

Side bolsters are attached to the elastomeric support webbing and are disposed adjacent the outer surfaces of the opposing side frame members. Side bolsters include a foam pad inserted into a bolster pocket to support a passenger in the vehicle seat. In one aspect of the invention, the side bolsters are fastened to the outer periphery of the elastomeric support webbing. In another aspect of the invention, the side bolsters are coupled with a pair of elastomeric fabric pieces to form an integrated seat back structural support assembly. In yet another aspect of the invention, side bolsters are sewn to a front facing of the outer periphery of the elastomeric support webbing and are secured in position about the seat back frame by an elastomeric closeout section extending between each rear surface of the side bolsters. The closeout section is connected to each side bolster by a coupling or the like.

A headrest or upper bolster is secured to the top of the frame of the seat assembly adjacent the side bolsters. The headrest assembly includes a resilient body having a pair of channels disposed on either side of the body to engage inner surfaces of the opposing substantially vertical side frame members and an outer finish material covering the resilient body of the headrest assembly. Alternatively, an upper bolster may replace the headrest assembly. Upper bolster of the seat back assembly comprises a pad layer disposed about the top frame member and an outer finish material extending over the pad layer which is secured to a top horizontal edge of elastomeric support webbing.

The above objects and other objects, features and advantages of the present invention are readily apparent from the following detailed description of the best mode for carrying out the invention when taken in connection with the accompanying drawings.

DETAILED DESCRIPTION OF THE INVENTION

Figure 2:
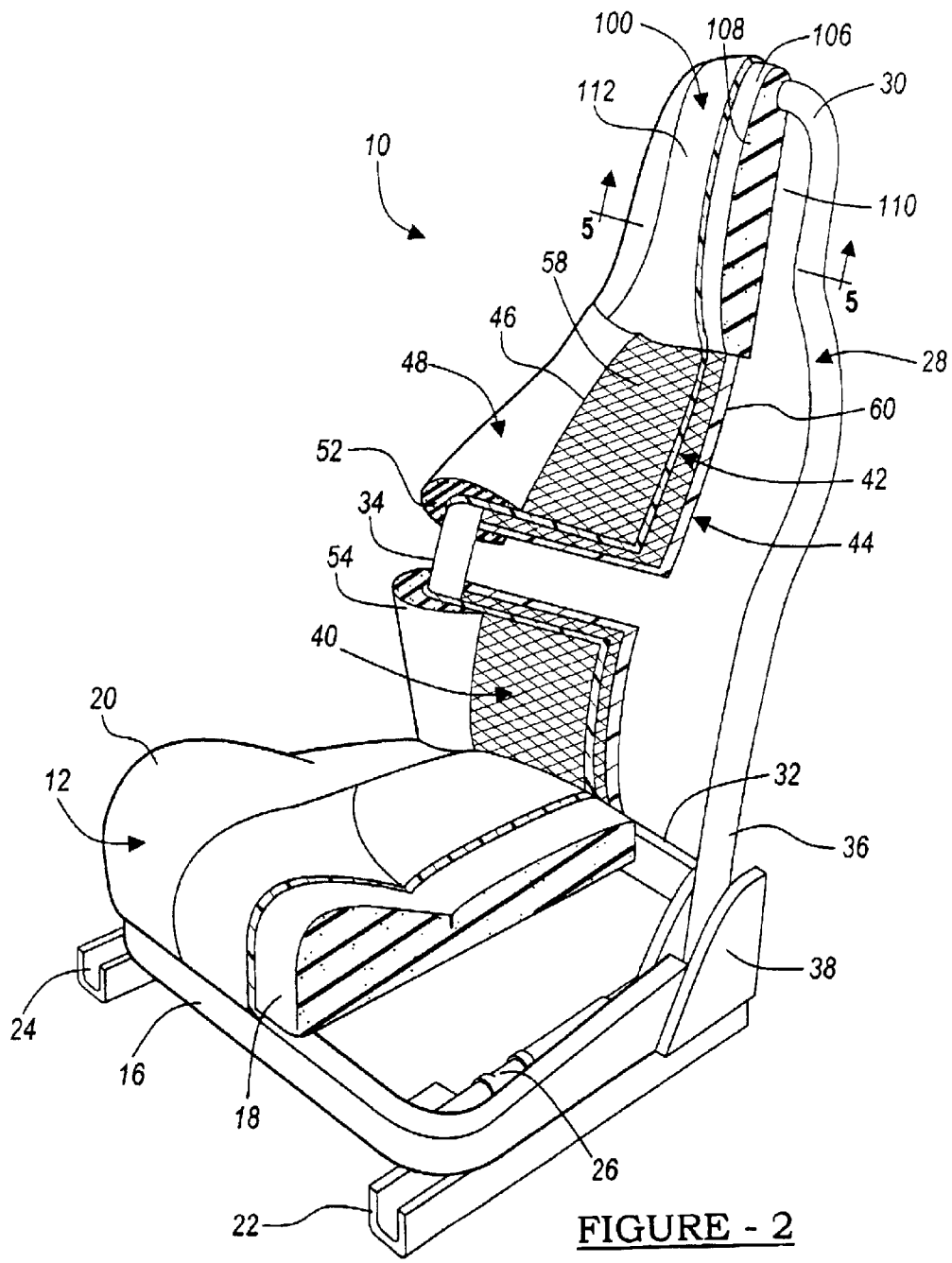
FIG. 2 is a perspective view in partial section of a vehicle seat having an elastomeric seat back assembly in accordance with one aspect of the present invention.

Referring now to FIG. 2, a vehicle seat assembly 10 of the present invention is illustrated having a seat bottom 12 and a separate seat back assembly 14. Seat bottom 12 is conventional in design and can be constructed in accordance with any known manner. As shown, the seat bottom assembly 12 generally includes a structural frame 16 covered by a suitable foam pad layer 18 and outer finish cover material 20. Seat bottom is configured to be secured to the floor of a vehicle. Seat frame 16 is coupled to a pair of rails 22 mounted to the floor of the vehicle. Each rail 22 includes a channel 24 extending longitudinally through the rail which receives a sliding mechanism 26 connected to a lower surface of the structural seat frame 16. Sliding mechanism 26 allows a user to move seat assembly 10 along the pair of rails 22 forward or rearward relative to the vehicle floor. Alternatively, seat frame 16 of seat bottom 12 may be mounted directly to the vehicle floor in a statutory position.

In accordance with one aspect of the present invention, seat back assembly 14 includes a frame 28 preferably formed from a lightweight material such as polycarbonate fiber or aluminum. In a preferred embodiment, frame 28 is formed as a one-piece, hollow tubular structure having a top frame member 30 and substantially vertical opposing side frame members 34, 36 extending from the top frame member. Frame 28 may also include a bottom frame member 32 disposed opposite top frame member 30 to provide additional structural support for opposing side frame members 34, 36. Opposing side frame members 34, 36 of seat back assembly 14 are pivotally connected to seat bottom 12 at a reclining mechanism 38. Alternatively, seat back assembly may be fixedly connected to seat bottom 12 of vehicle seat 10.

Frame 28 of seat back assembly 14 is covered by an elastomeric support webbing or sock 40. Sock 40 cooperates with frame 28 to provide structural support for the occupant seated in vehicle seat assembly 10. In one aspect of the invention, elastomeric sock 40 is formed from two identical size pieces of elastomeric fabric 42, 44, dimensioned and shaped to be sewn together at respective vertical edges 46, forming an inner periphery and an outer periphery of sock 40. Elastomeric sock 40 slides over frame 28 such that the inner periphery of elastomeric sock 40 extends about outer edges of opposing side frame members 34, 36, so as to pull the outer periphery of sock 40 taught across the frame 28 of seat back 14. In another aspect of the invention, the elastomeric sock 40 is formed from a single piece of elastomeric fabric stretched across the outer edges of opposing sides 34, 36 of frame 28. Each vertical edge of elastomeric sock 40 is fastened either to the backside of the elastomeric piece or to the outer edge of frame 28.

The elastomeric fabric used for sock 40 is selected to be of a finish quality and acts as the finish covering to the seat back assembly 14. In one embodiment of the invention, fabric of elastomeric sock 40 is cross-laced to provide structural support for seat back assembly 14. Alternative patterns for fabric may also be used to provide structural support fabric of elastomeric sock 40. An example of the type of elastomeric fabric filaments used to create the elastomeric sock 40 of the present invention is Hytrel, a registered trademark of the E. I. DuPont DeNemours Company. The elastomeric quality of the Hytrel fabric when stretched taught between frame 28 provides the necessary back support for a passenger of a vehicle, complying with all government safety standards, thereby eliminating the need to use any other separate back support mechanism underneath the elastomeric finish covering. The elastomeric sock arrangement described above is advantageous because the sock configuration significantly simplifies installation and reduces seat assembly time and cost.

Figure 3:
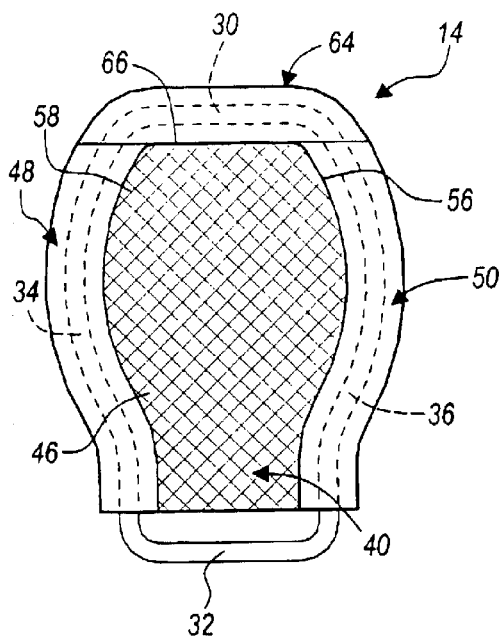
FIG. 3 is a front view of the seat back assembly of the present invention.
Figure 4:
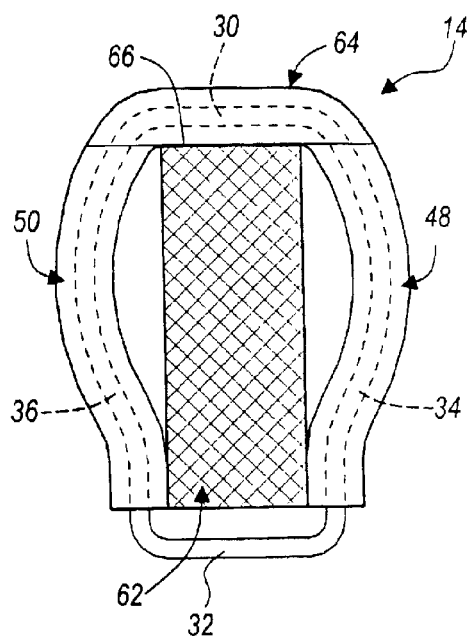
FIG. 4 is a back view of one aspect of the vehicle seat back assembly of the present invention.

Referring additionally to FIGS. 3 and 4, a pair of side bolsters 48, 50 are mounted about opposing sides 34, 36 of frame 28. Side bolsters 48, 50 are formed from a bolster material sewn as a pocket 52 filled with a foam pad insert 54. In one aspect of the invention, each of side bolsters 48, 50 is attached to the seat back assembly 14 by sewing or attaching a front edge 56 of the first end of bolsters 48, 50 to the front facing 58 of the fabric of elastomeric sock 40 along vertical edges 46. The second end of bolster pocket 52 is then sewn to the outer surface of the back facing 60 of elastomeric sock 40. Alternatively, second ends of bolster 48, 50 are connected to one another by an elastomer closeout section 62.

In an alternative aspect of the present invention, side bolsters 48, 50 are formed with pieces 42, 44 of elastomeric sock 40 to provide the structural support for seat back assembly 14. The vertical edges 46 of each piece 42, 44 of elastomeric sock are sewn to an outer surface of bolsters 48, 50, prior to the foam pad insert 54 being placed into bolster pocket 52. Each of the side bolster 48, 50 are then slid over frame 28 so as to pull both pieces 42, 44 extending between opposing sides 34, 36 taught across the seat back assembly 14.

In accordance with another aspect of the invention shown in FIG. 4, a closeout section 62 formed from the same elastomeric fabric as the elastomeric sock 40 is positioned in the center of the backside of frame 28 and attached to the second ends of side bolsters 48, 50 to pull the bolsters tight about the sides of the seat back assembly 14. In an alternative arrangement, if a single piece elastomeric sock is used, the back edge of the bolster can be secured to an inner surface of frame 28 or the backside surface of the elastomeric sock, and the closeout section 62 fastened to each bolster so as to pull the bolsters tight and provide a finish covering on the backside of the seat back assembly 14.

Seat back assembly 14 of vehicle seat 10 may not include a headrest. As illustrated in FIGS. 3 and 4, an upper bolster 64 may be formed to extend about the top surface 30 of frame 28 in a manner similar to the side bolsters 48, 50. Upper bolster 64 is sewn to a top horizontal surface 66 of elastomeric sock 40 and side bolsters 48, 50 to secure the bolster 64 to the seat back assembly 14.

With the seat back assembly 14 of vehicle seat 10 of the present invention, the use of the elastomeric seat back material as both a finish seat cover and a structural back support mechanism allows the present invention to reduce weight of a vehicle seat by up to 40 percent. The significant reduction in weight is of great benefit to improving fuel efficiency (as a result of overall lower vehicle weight) in conventional vehicles, as well as contributing to lower overall vehicle for alternative fuel/electric vehicles.

Figure 5:
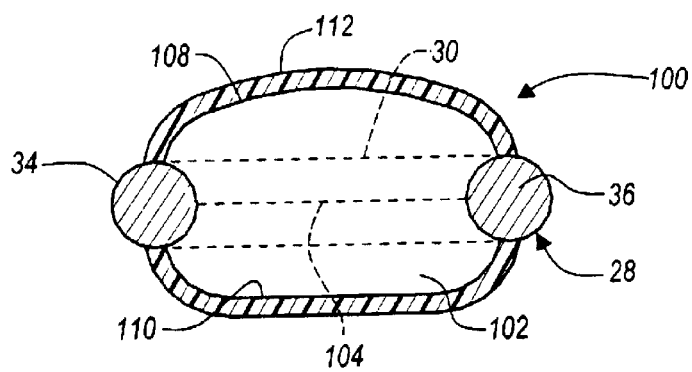
FIG. 5 is a sectional view along line 5—5 of FIG. 2 of a slide over headrest assembly in accordance with an aspect of the present invention.

Referring now to FIGS. 2 and 5, a lightweight headrest assembly 100 is shown in accordance with another aspect of the present invention. More specifically, as best seen in FIG. 5, headrest 100 is formed as a saddle-like assembly having a base foam pad element 102 dimensioned and contoured to snugly fit between the inner side faces of seat back frame 28. In accordance with the present invention, the foam pad element is cut partially down the middle to form a partition 104 from the bottom end up toward the top end. The upper portion of the foam pad is preferably left unseparated so as to form a hinge or bridging portion 106 at the top end. The partition thus creates a front side pad piece 108, and a back side pad piece 110. An outer finish material 112 is fitted about the entire outer surface of the foam pad element, but left open along the bottom split.

The headrest is installed simply by sliding the slit open bottom end over the top of the seat back frame until the front side and back side pad elements nest together between the side portions of the seat back frame. The headrest is then secured into place by attaching the bottom edges of the outer finish fabric to the top edge of the lower seat backing material such as by stitching, gluing, or other type of snap or clip fastener.

Figure 1:
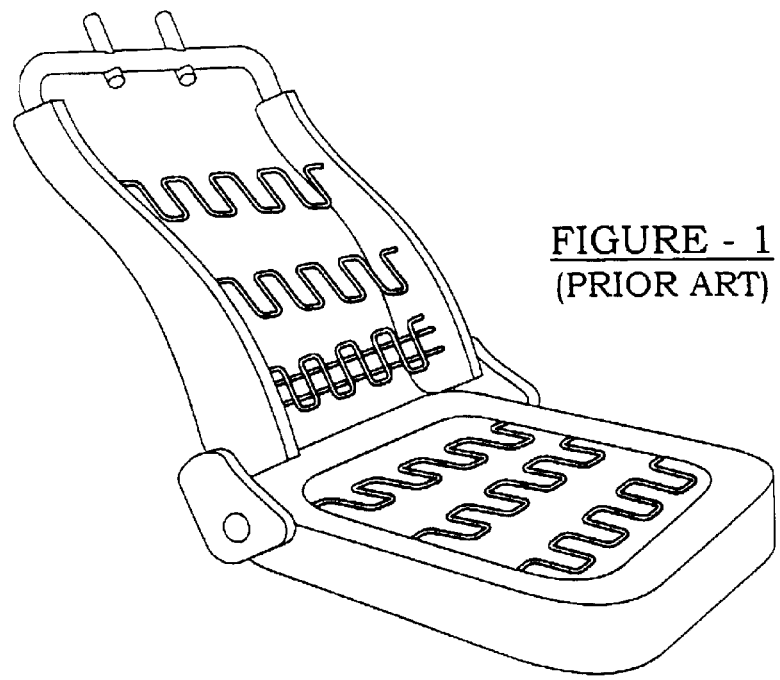
FIG. 1 is a perspective view of a conventional seat frame having separate back support spring mechanisms attached thereto.
Figure 6:
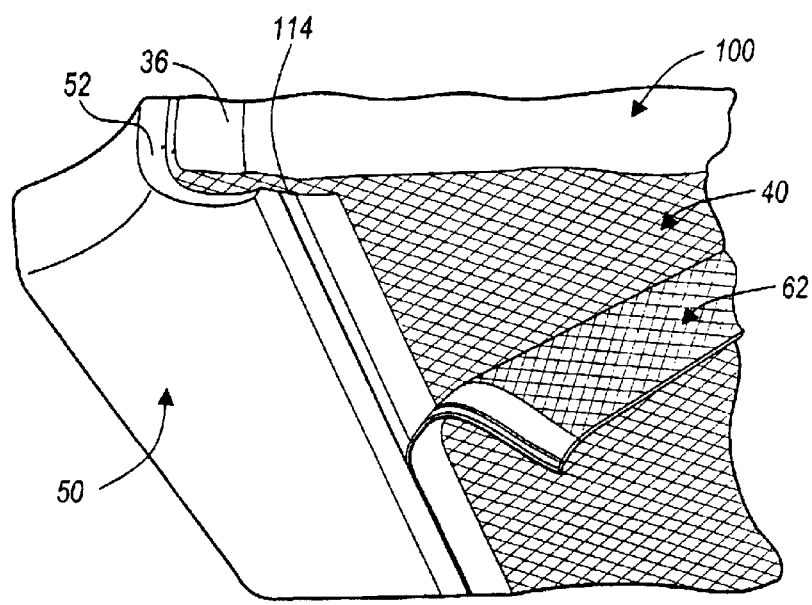
FIG. 6 is a perspective view of a partial section of a vehicle seat of the present invention showing a close-up view of the closeout section coupled to the side bolster of the seat back assembly.

In an illustrative embodiment shown in FIG. 6, elastomeric sock 40 and lightweight headrest 100 of the present invention are advantageously used together in a seat back assembly 14 of vehicle seat 10 to provide both reduction in overall seat weight, and simplified final seat assembly. Like elements to those previously described have been denoted with the same reference numbers. Closeout section 62 is attached to the side bolsters 48, 50 using a two-piece J-clip coupler 114 to facilitate easy removal of the structural support section from frame 28 of seat back assembly 14. Once the closeout section 62 is removed, the entire elastomeric sock 40 including the attached bolsters 48, 50 can be slid off the seat back frame 28 in one step to disassemble frame 28.

While the best mode for carrying out the invention has been described in detail, those familiar with the art to which this invention relates will recognize various alternative designs and embodiments for practicing the invention within the scope of the appended claims.

What is claimed is:

1. A vehicle seat back assembly comprising:
   a frame having a top frame member, a bottom frame member and a pair of opposing substantially vertical side frame members extending therebetween,
   an elastomeric support webbing extending between and cooperating with the opposing side frame members to provide structural support for the seat back assembly, the elastomeric support webbing including a pair of elastomeric fabric pieces secured to one another about common vertical edges to form an inner periphery extending around an outer surface of each of the opposing side frame members and an outer periphery stretched between the opposing side frame members;
   a pair of side bolsters mounted about the opposing side frame members having a first end secured to a front surface of the outer periphery of the elastomeric support webbing and a second end;
   an elastomeric closeout section releasably attached to the second end of each side bolster to secure the side bolsters in position on the opposing side frame members to provide structural support to the elastomeric support webbing extending therebetween; and
   a headrest assembly secured to the top frame member adjacent the pair of side bolsters on the opposing side frame members, the headrest assembly having a resilient body including a pair of channels disposed on opposing sides of the body engaging inner surfaces of the opposing side frame members and an outer finish material covering the resilient body secured to the top horizontal edge of the elastomeric support webbing.

2. The vehicle seat back assembly of claim 1 wherein the frame further comprises a bottom frame member disposed opposite the top frame member extending between the opposing side frame members to provide additional structural support to the opposing substantially vertical side frame members.

3. The vehicle seat back assembly of claim 1 wherein the elastomeric support webbing and closeout section are formed of a resilient polymeric material.

4. The vehicle seat back assembly of claim 3 wherein the elastomeric support webbing and closeout section are formed of Hytrel.

5. The vehicle seat back assembly of claim 1 wherein the pair of elastomeric fabric pieces are secured to corresponding first and second ends of the side bolsters to form the inner and outer periphery of the elastomeric support webbing.

6. A vehicle seat back assembly comprising:
   a seat bottom;
   a seat back assembly connected to the seat bottom, the seat back assembly comprising:
      a frame having a top frame member, a bottom frame member and a pair of opposing substantially vertical side frame members extending therebetween,
      an elastomeric support webbing extending between and cooperating with the opposing side frame members to provide structural support for the seat back assembly, the elastomeric support webbing including a pair of elastomeric fabric pieces secured to one another about common vertical edges to form an inner periphery extending around an outer surface of each of the opposing side frame members and an outer periphery stretched between the opposing side frame members;
      a pair of side bolsters mounted about the opposing side frame members having a first end secured to a front surface of the outer periphery of the elastomeric support webbing and a second end;
      an elastomeric closeout section releasably attached to the second end of each side bolsters to secure the side bolsters in position on the opposing side frame members to provide structural support to the elastomeric support webbing extending therebetween; and
      a headrest assembly secured to the top frame member adjacent the pair of side bolsters on the opposing side frame members, the headrest assembly having a resilient body including a pair of channels disposed on opposing sides of the body engaging inner surfaces of the opposing side frame members and an outer finish material covering the resilient body secured to the top horizontal edge of the elastomeric support webbing.

7. The vehicle seat back assembly of claim 6 wherein the seat assembly frame further comprises a bottom frame member disposed opposite the top frame member extending between the opposing side frame members to provide additional structural support to the opposing substantially vertical side frame members.

8. The vehicle seat back assembly of claim 6 wherein the elastomeric support webbing and closeout section are formed of a resilient polymeric material.

9. The vehicle seat back assembly of claim 8 wherein the elastomeric support webbing and closeout section are formed of Hytrel.

10. The vehicle seat back assembly of claim 6 wherein the pair of elastomeric fabric pieces are secured to corresponding first and second ends of the side bolsters to form the inner and outer periphery of the elastomeric support webbing.

* * * * *